United States Patent [19]
Gallagher et al.

[11] Patent Number: 5,853,617
[45] Date of Patent: Dec. 29, 1998

[54] METHOD AND COMPOSITION FOR SUPPRESSING OIL-BASED FOAMS

[76] Inventors: Christopher T. Gallagher; Patrick J. Breen; Brian Price; Alan F. Clemmit, all of Baker Performance Chemicals 1600 Industrial Blvd., Sugarland, Tex. 77478

[21] Appl. No.: 856,439

[22] Filed: May 14, 1997

[51] Int. Cl.$^6$ .............................. B01D 19/04; C09K 3/00
[52] U.S. Cl. ........................................... 252/321; 252/358
[58] Field of Search ................................... 252/321, 358; 508/206, 207

[56] References Cited

U.S. PATENT DOCUMENTS

| | | | |
|---|---|---|---|
| 3,640,893 | 2/1972 | Forbes et al. | 252/321 |
| 3,974,120 | 8/1976 | Razzano et al. | 528/140 |
| 4,329,528 | 5/1982 | Evans | 585/3 |
| 4,411,806 | 10/1983 | Tirtiaux et al. | 252/358 X |
| 4,460,493 | 7/1984 | Lomas | 252/321 |
| 4,537,677 | 8/1985 | Keil | 208/370 |
| 4,557,737 | 12/1985 | Callaghan et al. | 55/87 |
| 4,564,665 | 1/1986 | Callaghan et al. | 528/21 |
| 4,577,040 | 3/1986 | Kaufmann et al. | 556/462 |
| 5,354,505 | 10/1994 | Mendoza | 252/358 |
| 5,397,367 | 3/1995 | Fey et al. | 44/320 |

FOREIGN PATENT DOCUMENTS

| | | |
|---|---|---|
| 0167361 | 1/1986 | European Pat. Off. . |
| 1543596 | 4/1979 | United Kingdom . |
| 2234978 | 2/1991 | United Kingdom . |
| 2244279 | 11/1991 | United Kingdom . |

OTHER PUBLICATIONS

P. R. Garrett, ed., *Defoaming: Theory and Industrial Applications,* I. C. Callaghan, Chapter 2, "Antifoams for Nonaqueous Systems in the Oil Industry," Marcel Dekker, Inc., New York, 1993, pp. 119–150.

*Primary Examiner*—Richard D. Lovering
*Attorney, Agent, or Firm*—Madan & Morris, PLLC

[57] ABSTRACT

It has been surprisingly discovered that the use of two different conventional defoamers give surprisingly and synergistic results when used together to suppress oil-based foams. The use of both a fluorosilicone together with a non-fluorinated siloxane give both reduced liquid carry over into a gas stream and reduced gas carry under into a liquid stream in a separation process. The fluorosilicone and non-fluorinated siloxane may be added together to a system producing an oil-based foam, or separately in any sequence. On some oil-based foams, the inventive blend achieves a level of performance unattainable by conventional defoamers at any dose. In most cases, better overall performance is obtained with the inventive foam suppressing blend at lower doses and less cost than with conventional defoamers used single.

13 Claims, 10 Drawing Sheets

Figure 3 — Well C

Well C

METHOD AND COMPOSITION FOR SUPPRESSING OIL-BASED FOAMS

FIELD OF THE INVENTION

The invention relates to methods and chemical compositions for the suppression or inhibition of oil-based foams, and, in one aspect, more particularly relates to methods and chemical compositions employing siloxanes and fluorosilicones for suppressing oil-based foams.

BACKGROUND OF THE INVENTION

Crude oil and gas are produced in offshore platforms at high pressures, from about 8,000 to 10,000 psi, and passed through several vessels ("separators") designed to separate the oil and gas and also lower the pressure in steps to a level which can be handled by the pipeline. As the pressure drops, dissolved gas will evolve and could easily generate a foam which interferes with the separation. The retention time of vessels is very short, on the order of minutes, due to the enormous volumes being processed, which can range from about 20,000–100,000 barrels/day of oil. Separation must therefore be rapid for the vessels to function properly. Oil producers have not found a mechanical solution to this problem, since they are limited by the economics of offshore equipment, and thus have had to rely on chemical defoamers to realize maximum production rates.

An overview of the situation is given by Ian C. Callaghan in "Antifoams for Nonaqueous Systems in the Oil Industry", Chapter 2 in P. R. Garrett, ed., *Defoaming: Theory and Applications*, Marcel Dekker, Inc., 1993, pp. 119–150. This chapter indicates that developing a universal or general antifoam composition which is generally applicable is difficult due to the numerous factors interacting in complex ways, including, but not limited to, the nature of the oil phase, the nature of the filler gas, bulk rheological properties, interfacial rheological properties, and the like.

Specific antifoaming treatments may be seen in patents such as U.S. Pat. No. 3,640,893 which relates to compositions for use in combating foam formation in aqueous systems comprised of a mineral base oil and 0.1 to 25% by weight of a fatty acid product resulting from the hydrolysis of a lipid extract obtained by solvent extraction of microorganism culture grown on a hydrocarbon substrate.

Diorganopolysiloxane copolymers having a viscosity from 100,000 to 200,000,000 centipoise at 25° C., are produced by (a) forming an admixture of (I) a cyclic alkyl trifluoropropyl trisiloxane, (ii) a second cyclic diorgano trisiloxane, (I) being present in an amount of 40 to 85 mol % of the total of (i) and (ii), (iii) from 5 to 300 ppm of an alkyl lithium catalyst, the alkyl component containing from 1 to 12 carbon atoms, and (iv) an aprotic solvent, said aprotic solvent being capable of dissolving both the trimers (I) and (ii) and the copolymer product, (b) reacting said admixture at a temperature between 0° C. and 150° C. to form the copolymer, and (c) recovering the copolymer from the reaction mixture, according to U.S. Pat. No. 3,974,120. These copolymers are said to have use as defoamers. Similarly, British Patent Specification 1,543,596 also relates to diorganopolysiloxane copolymers said to be useful as defoamers, and processes for preparing them.

There remains a need for new compositions and methods for suppressing foams that work more generally under a wide variety of conditions and more completely.

SUMMARY OF THE INVENTION

Accordingly, it is an object of the present invention to provide compositions of matter effective in the suppression of oil-based foams.

It is another object of the present invention to provide methods and compositions for minimizing both gas carry under and liquid carry over.

It is yet another object of the invention to provide methods and compositions for suppressing oil-based foams that can be readily implemented.

In carrying out these and other objects of the invention, there is provided, in one form, a method for suppressing oil-based foam in a system, where the method involves introducing a fluorosilicone into the foam, and introducing a non-fluorinated siloxane into the foam. The fluorosilicone and the non-fluorinated siloxane may be added in any sequence.

DETAILED DESCRIPTION OF THE INVENTION

Figure 1:
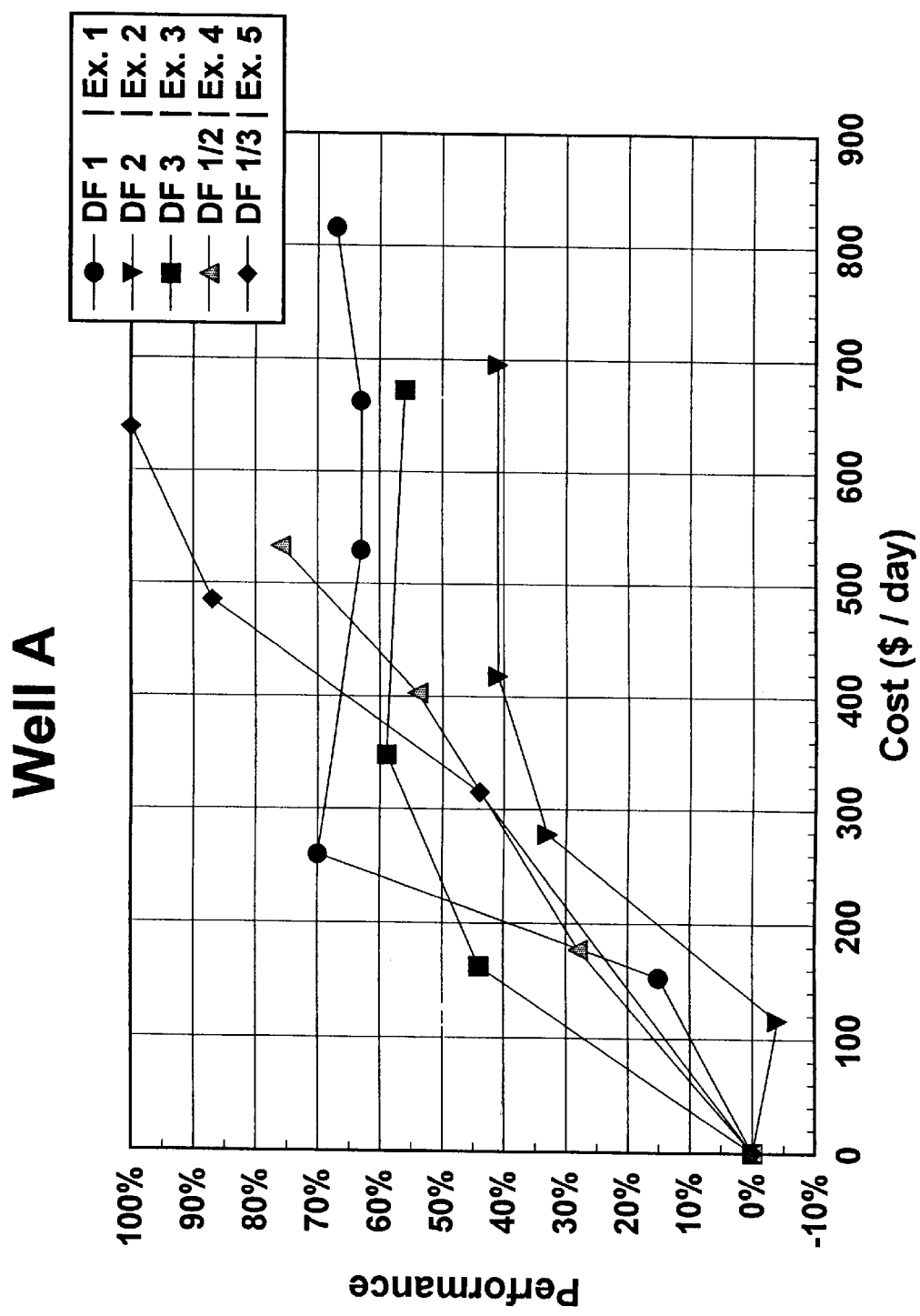
FIG. 1 shows plots of foam suppressant performance versus cost ($/day) for various comparative and inventive foam suppressant formulations of Examples 1–5 for an oil-based foam of Well C.

It has been discovered that the simultaneous use of fluorosilicone and silicone defoamers to inhibit oil-based, nonaqueous foam in crude oil production systems gave results that were significantly better than the sum of the parts. Further, it was discovered that the two components appeared to operate in somewhat different ways mechanistically. The fluorosilicones seemed to be better at reducing the amount of liquid "carry over" in the gas, whereas conventional, non-fluorinated silicones seemed to be more effective at preventing gas "carry under" in the oil. The method has been discovered to be effective if the two components are added to the system together, as in a composition or blend, or separately, in any sequence.

The term foam suppressants used herein should be understood to include both the terms antifoaming agent and defoaming agent. Similarly, the term "suppressing foam" should be understood as including both antifoaming and defoaming. Antifoaming is the prevention of foam in whole or in part. Defoaming is the diminishing or eliminating an already existing foam.

Non-fluorinated siloxanes are well known as defoamers and antifoamers. A particularly preferred non-fluorinated siloxane is polydimethylsiloxane (PDMS). Other suitable non-fluorinated siloxanes include, but are not necessarily limited to, polydialkylsiloxanes in general. These materials are also called silicones, organosiloxanes and oxosilanes. Block copolymers of PDMS and polybutadiene are specifically excluded from the list of suitable non-fluorinated siloxanes. The weight average molecular weight of the suitable non-fluorinated siloxanes may range from about 5,000 to about 1,000,000, preferably from about 30,000 to about 600,000.

The fluorosilicone, sometimes abbreviated FS, is an at least partially fluorinated siloxane. Fluorosilicones may be produced by polymerizing cyclic siloxanes containing fluorine, or by copolymerizing fluorine-containing and non-fluorine-substituted siloxanes. Diorganopolysiloxanes containing fluoroalkyl and/or fluoroalkyloxyalkyl groups can be made by hydrolyzing dichlorosilanes containing fluoroalkyl and/or fluoroalkyloxyalkyl groups and then equilibrating the hydrolyzed product in the presence of an alkylammonium hydroxide catalyst. The weight average molecular weight of the suitable fluorosilicones may range from about 1,000 to about 1,000,000, preferably from about 3,000 to about 100,000.

The weight ratio of fluorosilicone introduced into the foam to the non-fluorinated siloxane introduced into the foam ranges from about 2 to 98 to about 98 to 2. Stated another way, where the fluorosilicone and the non-fluorinated siloxane are added together as a composition, the proportion of fluorosilicone ranges from about 2 to about 98 wt. %, and the proportion of non-fluorinated siloxane ranges from about 98 to about 2 wt. %. In a preferred embodiment of the invention, the proportion of fluorosilicone ranges from about 40 to about 2 wt. %, and the proportion of non-fluorinated siloxane ranges from about 60 to about 98 wt. %. These preferred proportions would also apply to a method where the two components are added separately.

Optionally, when the two components are added together as a blend or composition, there may be present a solvent, which may range from about 50 to about 98 wt. %, preferably from about 55 to about 95 wt. %. The choice of solvent includes, but is not necessarily limited to methyl isobutyl ketone, acetone, methyl ethyl ketone, or other ketones with kerosene, diesel, Stoddard solvent, and other aliphatic refinery distillates and combinations thereof.

Generally the method and compositions of this invention would have sufficient defoaming activity on crude hydrocarbon stock in generally the temperature range of about 77° to 700° F. (25° to 371° C.) and more preferably at a temperature in the range of from about 77° to 500° F. (25° to 260° C.). The separators in which the crude hydrocarbon stocks such as crude oil are processed are usually operated at a temperature range from about ambient to 500° F. (ambient to 260° C.) and more preferably from about 100° to 200° F. (38° to 93° C.). More preferably, the methods and compositions of this invention as described above will act as effective foam suppressants at a temperature anywhere from room temperature, such as 77° F., to 500° F. (25° to 260° C.), and more preferably from 77° to 450° F. (25° to 232° C.).

Generally, there is utilized at least an effective amount of the foam suppressing components or compositions to produce an efficient defoaming or antifoaming of the crude hydrocarbon stocks. Such effective amounts are difficult to predict, since a number of complex factors affect the effective dosage, which factors include, but are not necessarily limited to, the nature of the hydrocarbon, the nature of the evolving gas, the composition and chemical nature of the components being used as foam suppressants, the temperature and pressure of the system being treated, and the like. However, in general, there may be utilized the components considered together, or the composition blend at a concentration of anywhere from 1 part per million (ppm) to 5 parts by weight (pbw) per 100 pbw of the crude hydrocarbon stocks or 5 percent by weight (wt. %) of the crude hydrocarbon stocks. If there is utilized a concentration of more than 5 pbw per 100 parts of the crude hydrocarbon stocks, then it is not expected to add any further foam suppressing activity to the operation, and, in addition, the cost of the composition or components becomes prohibitively high.

In application, the components separately, or together as a composition may be mixed with a compatible solvent to produce a solution having a viscosity ranging from 1 to 2,000 centipoise at 25° C., and then the solution is metered into the system to be treated by known metering techniques.

The components and/or compositions of this invention may be utilized in various kinds of processes and equipment to suppress foam in a system. In one embodiment, it is preferred for crude hydrocarbon stocks to be treated when they are processed in separators or distillation columns. However, the method may be utilized in most other organic foam systems in which foam suppression is desired. Accordingly, the method and components or compositions described herein may be utilized with advantage in any highly organic system in which the hydrocarbon stocks such as crude oil create foam and in which it is desired to eliminate or reduce the foam to increase the efficiency of processing the crude stocks. Thus, it is not meant to limit the method of the instant invention solely to suppressing foam of crude hydrocarbon stock such as crude oil, but the invention can be utilized to defoam crude hydrocarbon stocks other than crude oil which is high in hydrocarbon content, and which is the result of them being processed in a way that produces foam. Examples of such processes include, but are not necessarily limited to, degassing, scrubbing, liquifiable natural gas reinjection, and the like.

The invention will be described further in the following illustrative Examples, which are non-limiting and serve only to further teach the invention.

Test Procedures

Two tests were run to characterize the performance of the foam suppressant candidates in an actual system test separator vessel onboard an offshore production facility:

Liquid Carry Over

One test characterized the liquid carry over into the gas stream. To perform this test, a needle valve on the gas outlet was opened wide and purged of liquid that had settled into the valve. The valve was then closed slightly and the quality of the flow from the valve assigned a value ranging from 1 to 4 with 1 corresponding to low oil carry over, and 4 corresponding to high oil carry over.

Gas Carry Under

To perform this test, an oil sample was trapped in a length of ½" (1.4 cm) tubing at system pressure. The sample was then drained into a graduated column at ambient pressure to measure the amount of liquid trapped in the tubing. If more liquid was trapped in the tubing, then less gas was carried under with the oil. The volume of the test chamber was 135 ml.

Chemicals Tested

| Designation | Identity |
|---|---|
| DF-1 | 30% PDMS in Stoddard solvent |
| DF-2 | 5% Fluorosilicone in methyl isobutyl ketone and Stoddard solvent |
| DF-3 | 5% Fluorosilicone copolymer with PDMS in methyl isobutyl ketone and Stoddard solvent |

Discussion of Results

Field Test Separator Data: Examples 1–15

Of the three chemicals tested separately, only DF-1 was able to minimize the gas carry under (see Examples 1, 6, and 11). In one possible, non-limiting explanation, the DF-1 may reduce the interfacial elasticity and allows the oil to drain from the foam creating a thinner and lighter foam pad. DF-2 showed little effectiveness at reducing the carry under (Examples 2, 7, and 12). While DF-3 improved the gas carry under (Examples 3, 8, and 13), DF-3 did not compare well with DF-1. With regard to carry over, the situation is reversed. DF-3 and DF-2 reduced the carry over problem at much lower treating rates than the DF-1. Please compare Examples 3, 8, 13 and 2, 7, 12; with Examples 1, 6, and 11, respectively. In one non-limiting explanation, it is likely that these two products are causing accelerated film rupture. Therefore, these two products affect the carry over because they are active in the top of the foam pad where bubble film thickness is small. Both the DF-3 and the DF-2 performed similarly on wells C and A. However, on well B, DF-3 did not significantly reduce the oil carry over even at high treating rates (Example 8) while DF-2 did significantly reduce the oil carry over (Example 7).

The inventive blends performed best. Wells C and B were tested with about 80% DF-1 and about 20% of DF-3 or DF-2; please see Examples 4, 5, 9, and 10. In each of the two tests, it seemed that there was no synergy between the chemicals. The improvement seemed to be a linear superposition of the individual chemical's performance. The tests seemed to show that less DF-1 was needed when blended with enough DF-3 or DF-2 to clear the oil carry over. Therefore, less DF-1 was used on the test of well A and the resulting blends were 70% to 75% DF-1; please see Examples 14 and 15.

Several attempts were made to determine the foam lifetime in the graduated column, but none of the attempts correlated well. The qualitative ranking of foam lifetime for the treated oil samples from shortest to longest is DF-2, DF-3, DF-1. Since the DF-2 had the shortest foam lifetime, one might expect DF-2 to exhibit better performance than the other chemicals. However, DF-2 does not exhibit the best overall performance. This casts some doubt on foam lifetime as the sole predictive measure of defoamer performance.

Figure 2:
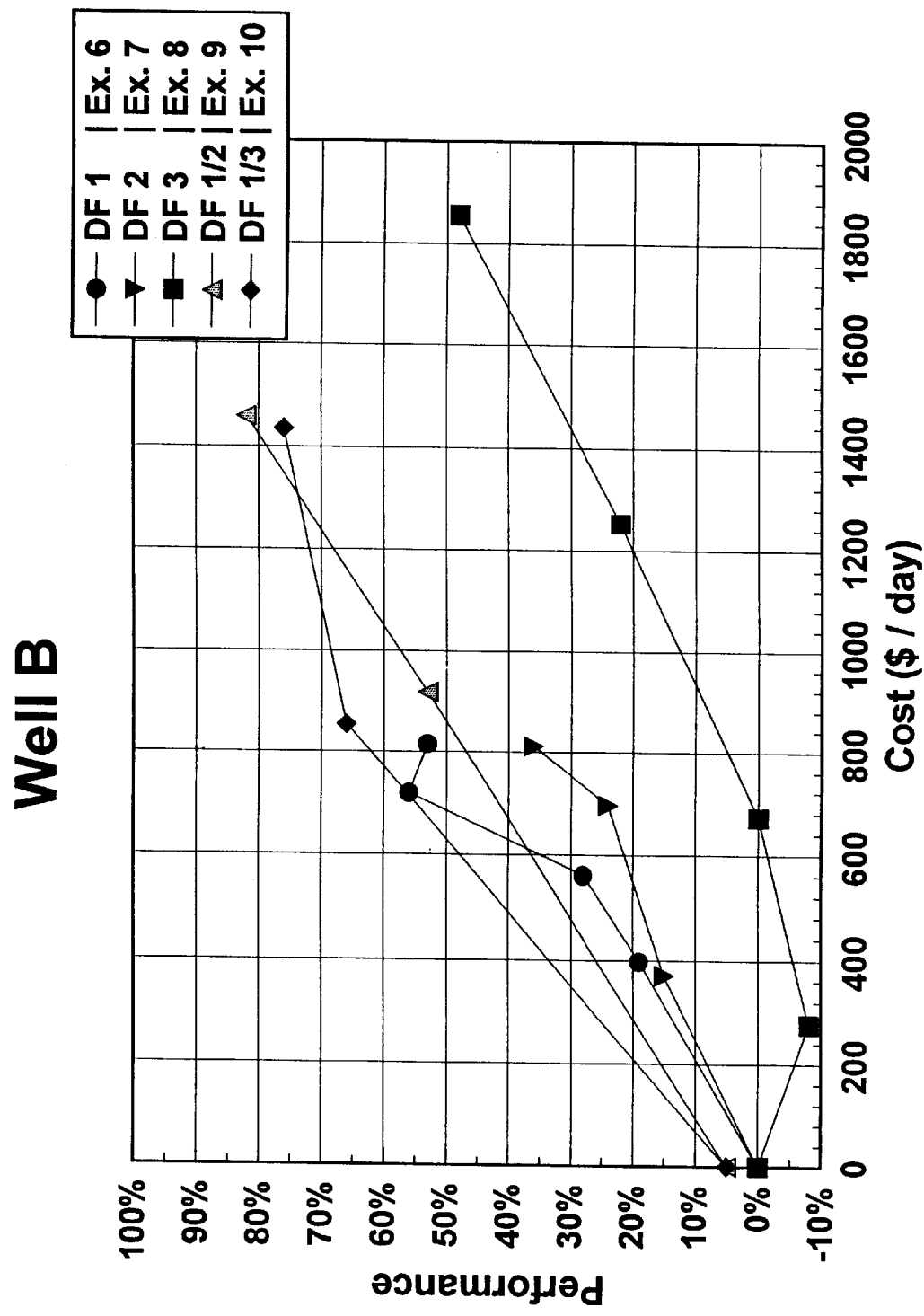
FIG. 2 shows plots of foam suppressant performance versus cost ($/day) for various comparative and inventive foam suppressant formulations of Examples 6–10 or an oil-based foam of Well B.
Figure 3:
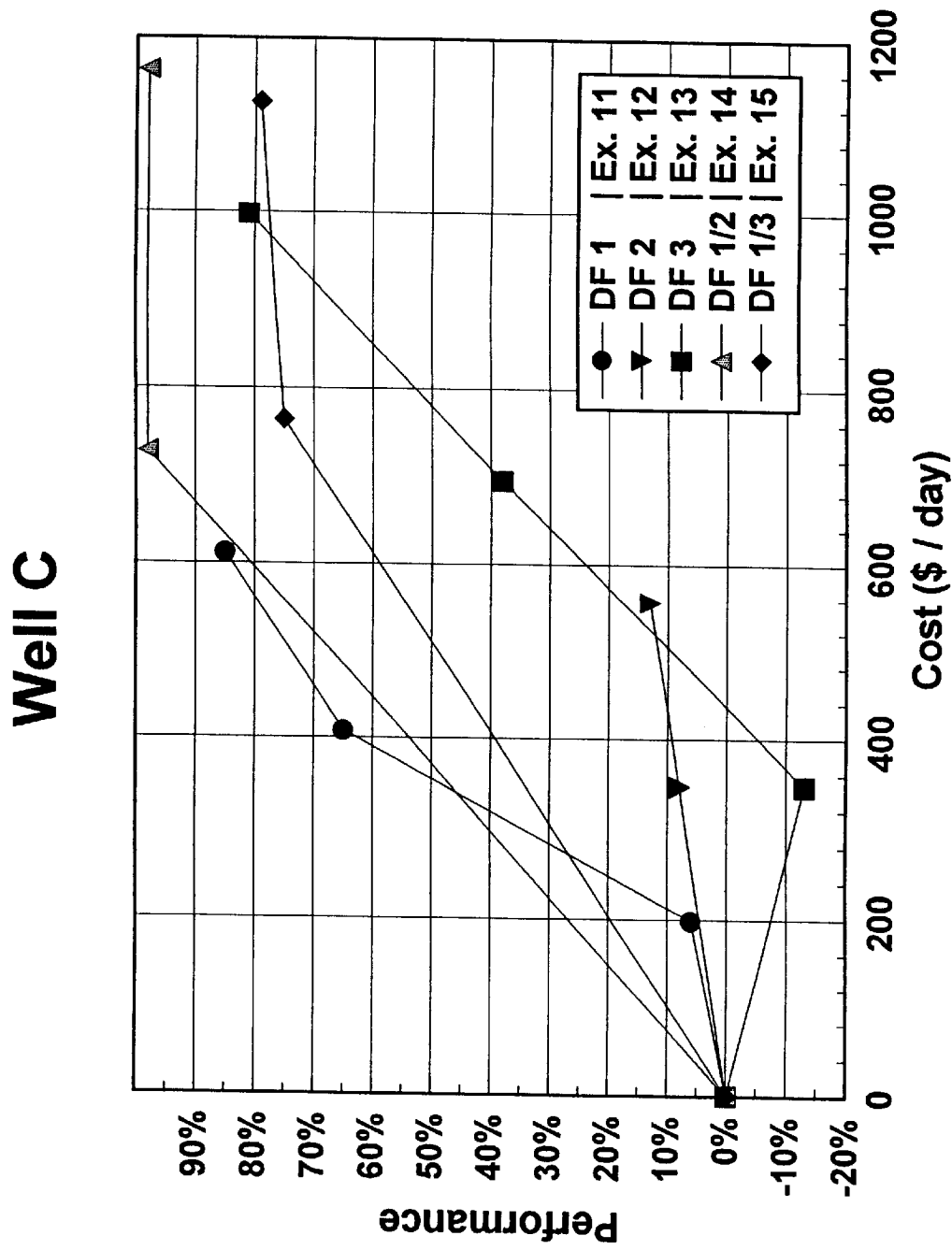
FIG. 3 shows plots of foam suppressant performance versus cost ($/day) for various comparative and inventive foam suppressant formulations of Examples 11–15 for an oil-based foam of Well A.
Figure 4:
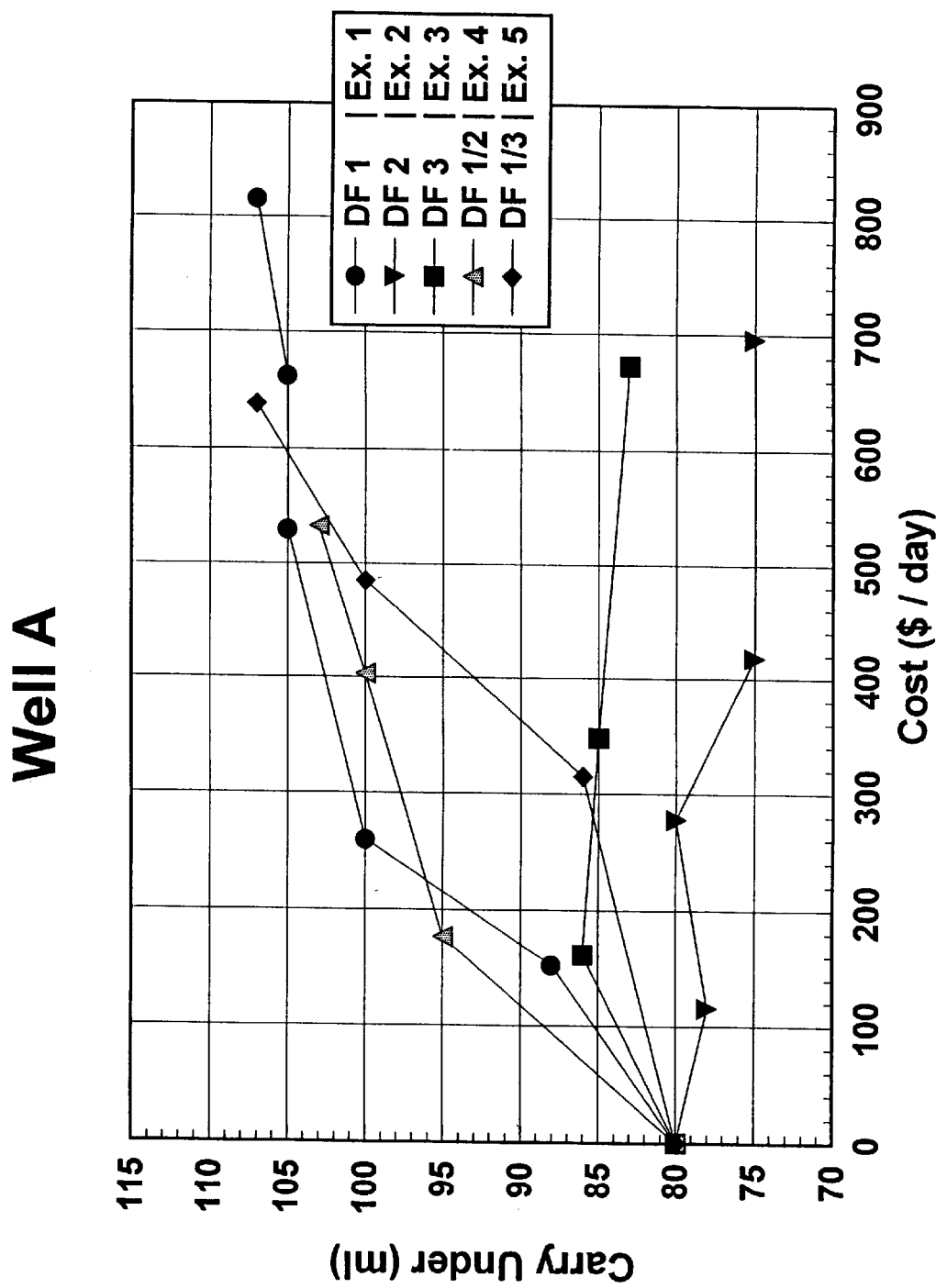
FIG. 4 shows plots of gas carry under versus cost ($/day) for various comparative and inventive foam suppressant formulations Examples 1–5 for an oil-based foam of Well C.
Figure 5:
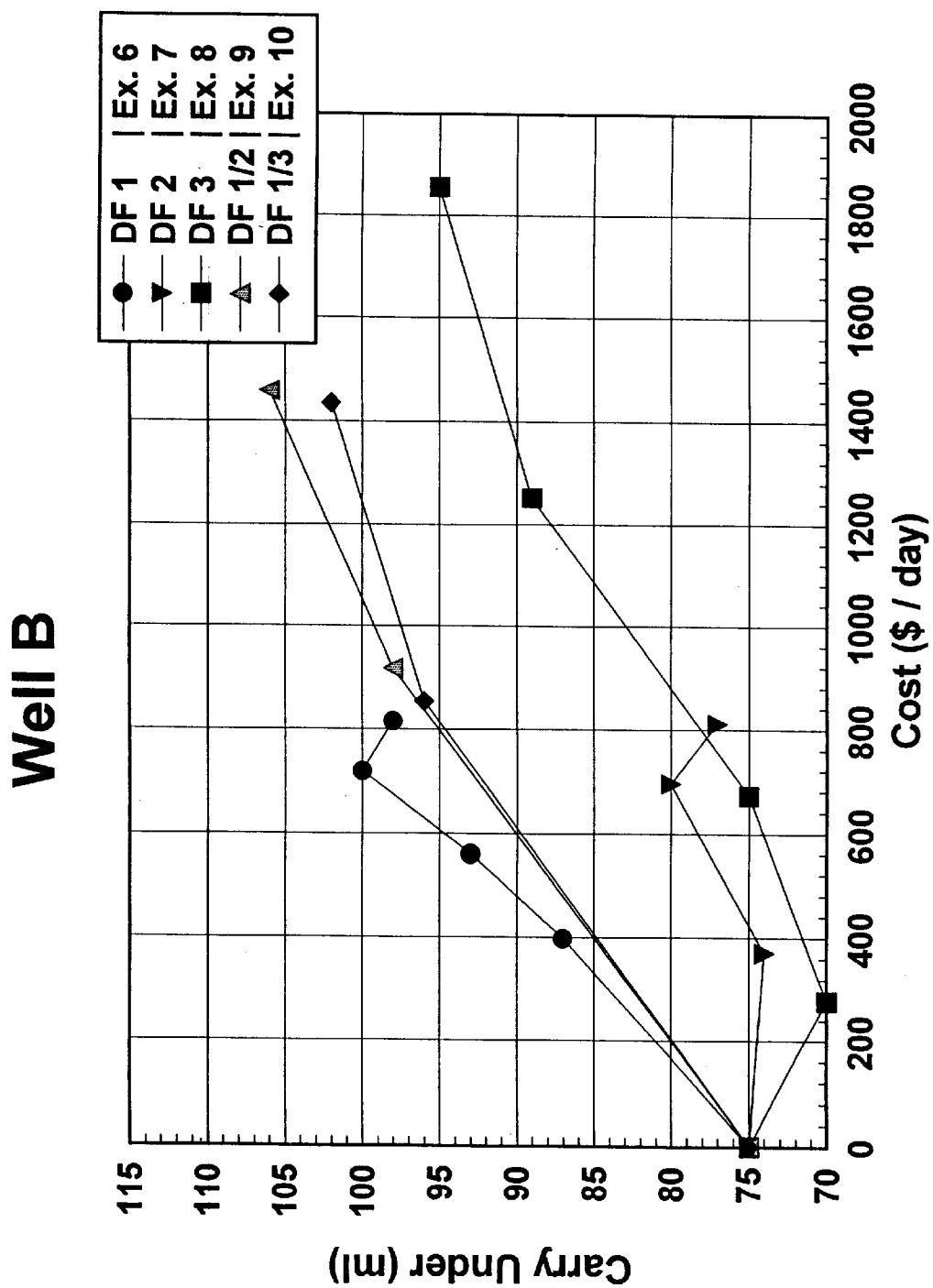
FIG. 5 shows plots of gas carry under versus cost ($/day) for various comparative and inventive foam suppressant formulations Examples 6–10 for an oil-based foam of Well B.
Figure 6:
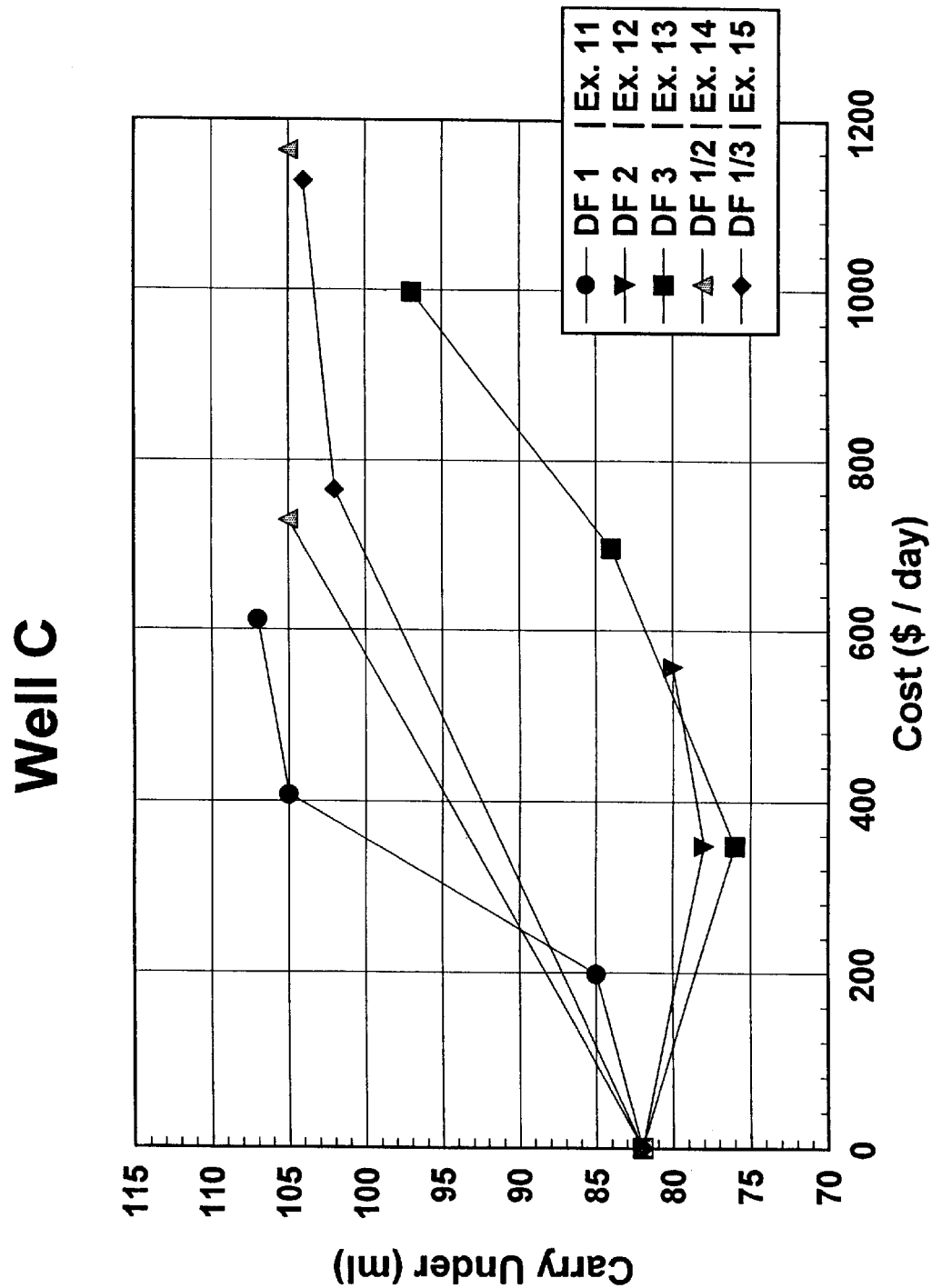
FIG. 6 shows plots of gas carry under versus cost ($/day) for various comparative and inventive foam suppressant Examples 11–15 for an oil-based foam of Well A.

Tables II through IV present the tabulated data. FIGS. 1–3 are plots of performance versus cost, while FIGS. 4–6 are plots of carry under versus cost. The performance was calculated with equation (1):

$$P = \frac{0.5(V - bv)}{dV} + \frac{0.5(4 - q)}{3} \qquad (1)$$

where

P is the performance,

V is the liquid volume, bv is the liquid volume with no chemical, dV is the difference between the highest liquid volume collected and bv for a given well, and q is the gas quality, on a scale of 1 to 4.

This equation is a 50:50 weighting of the liquid carry over and gas carry under results, with the first term quantifying gas carry under, and the second term quantifying liquid carry over. The cost was based on the daily treating rate.

It may be seen in the performance graphs of FIGS. 2 and 3 that the DF-1/DF-2 blend of this invention achieves a high degree of performance for the least cost for wells B and A (Examples 9 and 14), respectively. However, the DF-1/DF-3 inventive blend achieves a high degree of performance for the least cost for well C (Example 5). Considering these results, it is anticipated that the whole system could be treated with a blended product with improved performance and logistics. Indeed, in the oil-based foams from all wells, the performance levels achieved by the blends of this invention could not be achieved at all by any of the comparative, single component Examples at any cost or dosage level.

If only carry under is considered, DF-1 alone may be seen as the most cost effective performer, as seen in FIGS. 4, 5, and 6 (Examples 1, 6, and 11), yet the inventive blends are very close to DF-1 alone in being as cost effective if only carry under is considered (Examples 4 and 5, 9 and 10, 14 and 15).

Figure 7:
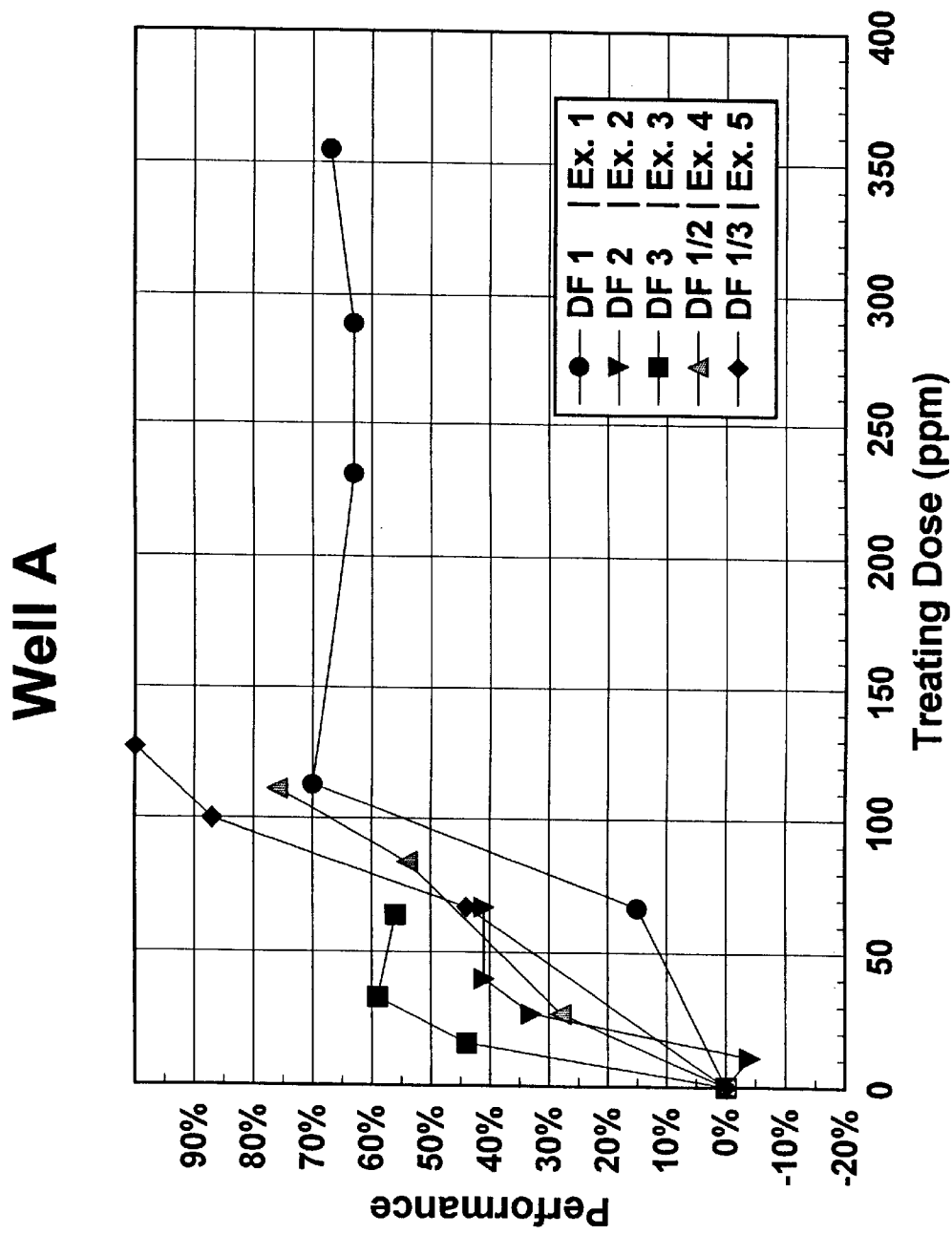
FIG. 7 shows plots of foam suppressant performance versus treating dose for various comparative and inventive foam suppressant Examples 1–5 for an oil-based foam of Well C.
Figure 8:
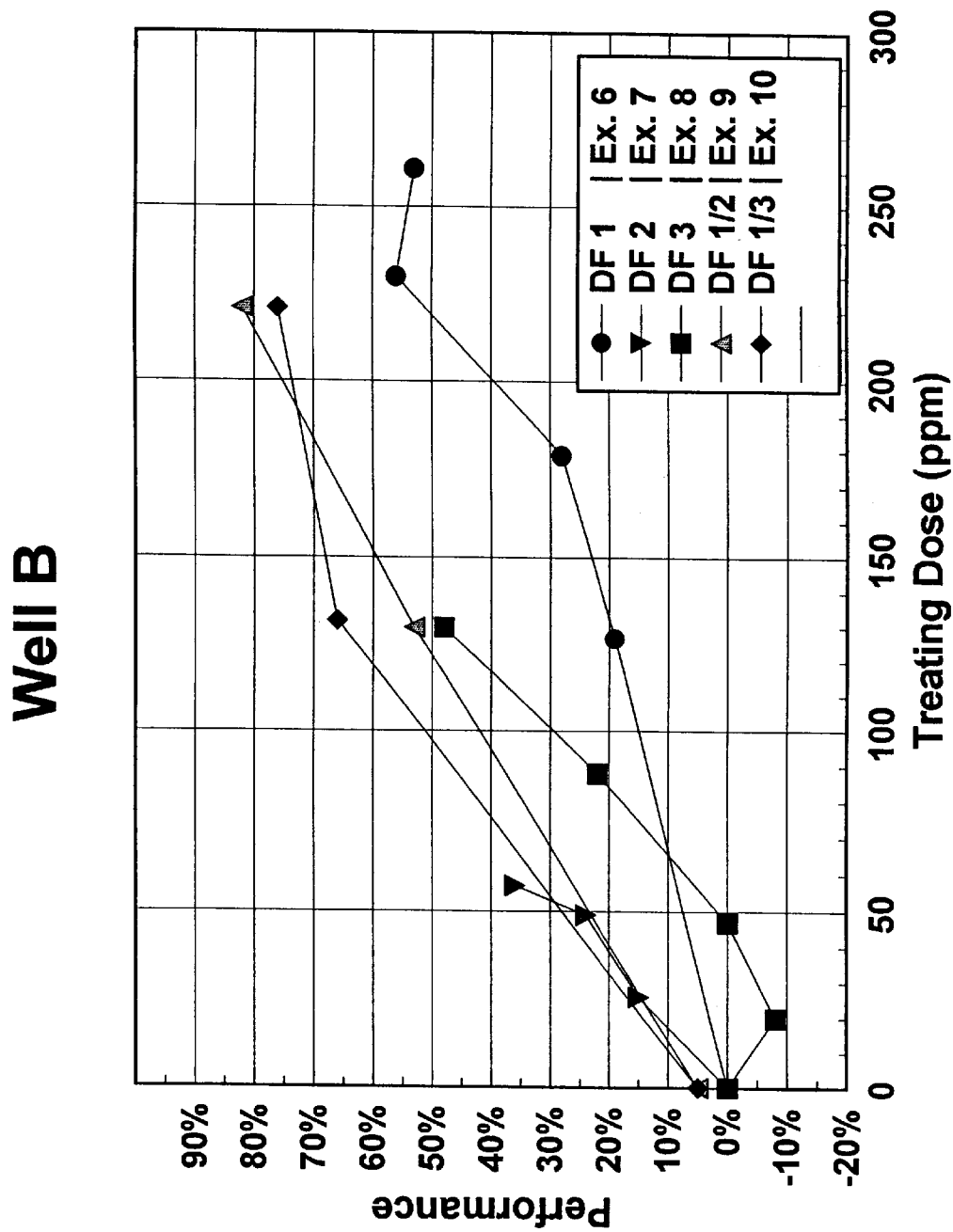
FIG. 8 shows plots of foam suppressant performance versus treating dose for various comparative and inventive foam suppressant Examples 6–10 for an oil-based foam of Well B.
Figure 9:
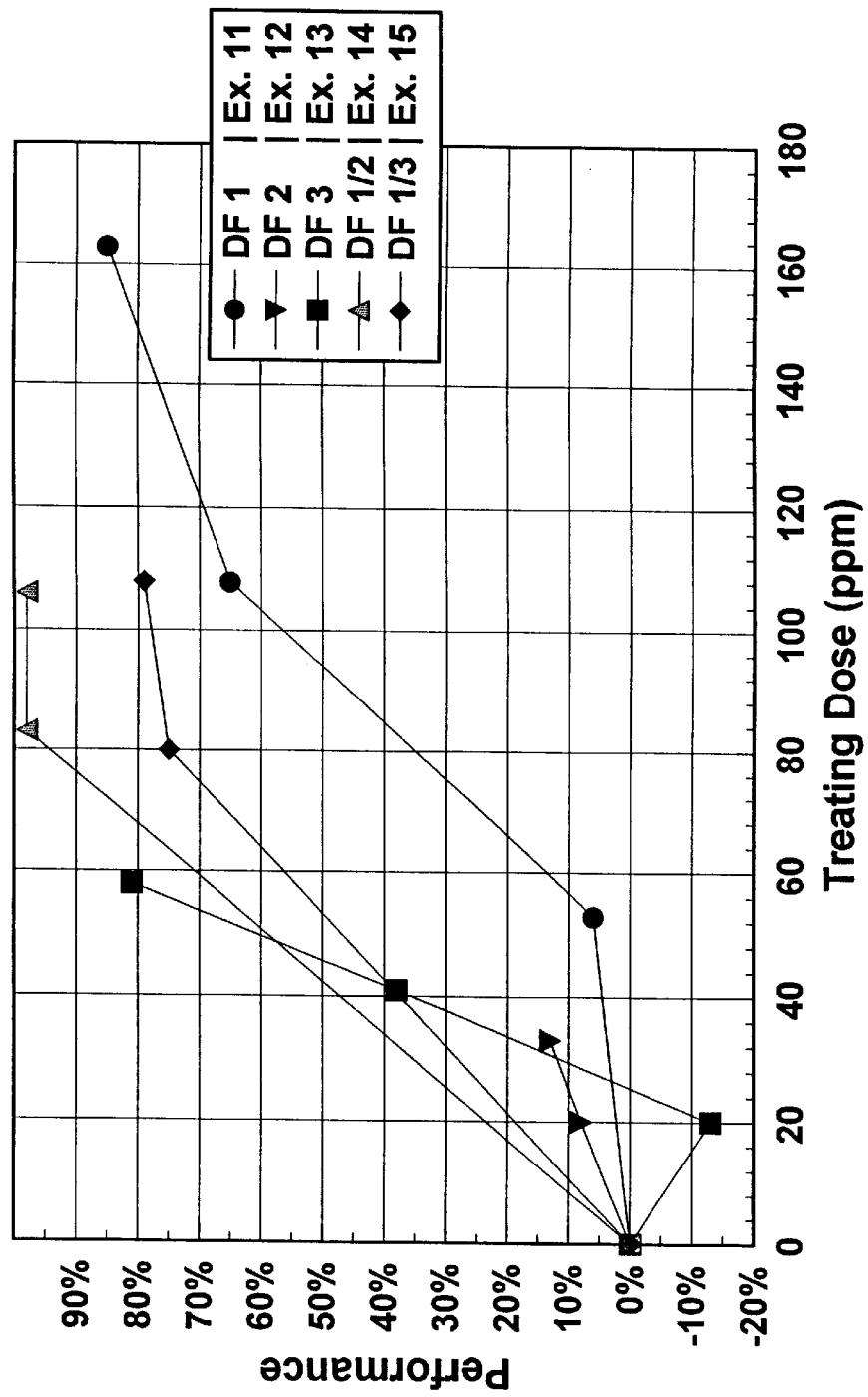
FIG. 9 shows plots of foam suppressant performance versus treating dose for various comparative and inventive foam suppressant Examples 11–15 for an oil-based foam of Well A.

Shown in FIGS. 7, 8, and 9 are plots of foam suppression performance as a function of treating dose for Examples 1–5, 6–10, and 11–15, respectively. It is readily seen that for the inventive blend Examples, 4–5, 9–10, and 14–15, that better overall performance is achieved at lower doses than for the comparative examples using only one component. For instance, in FIG. 7, the curves for comparative Examples 1–3 level out at performance levels consistently below those obtainable in inventive Examples 4 and 5, and where the latter performances are obtained at a lower dose. This behavior is proof that the effects obtained with the blends and methods of this invention are not merely additive, but unexpectedly synergistic.

This same conclusion may be drawn from FIG. 8, where the curves for Examples 9 and 10 indicate much better performance may be obtained at lower doses than for the comparative Examples 6–8. The same may be said for the results plotted in FIG. 9. Not all of the curves for the comparative Examples are provided to the point where they level out, for instance, as does the curve in FIG. 8 for comparative Example 6. Nevertheless, the data charted covers the usable range; i.e. the range that most users are likely to practice. The inventive Examples clearly demonstrate that uniformly better results are obtained at lower cost and lower treating doses than for the conventional, single component foam suppressants. Indeed, these results could not have been predicted based on the conventional single-component Examples, since the inventive results are more than merely additive.

TABLE I

Well Data

| Well | Separator Pressure (psig) | Separator Temperature (°F.) | Stock Tank Oil (BOPD) | Gas (mmscfd) | GOR (scf/bbl) |
|---|---|---|---|---|---|
| A | 1460 | 122 | 17568 | 22.3 | 1269 |
| B | 1451 | 113 | 14619 | 10.3 | 706 |
| C | 1445 | 111 | 10720 | 9.5 | 889 |

TABLE II

Well C Data

Comparative Example 1 - DF-1 Only

| GPD | ppm | Carry Over | Carry Under | Cost/Day | Performance |
|---|---|---|---|---|---|
| 160 | 335 | 3 | 107 | $816 | 67% |
| 130 | 289 | 3 | 105 | $663 | 63% |
| 104 | 231 | 3 | 105 | $530 | 63% |
| 51 | 113 | 2 | 100 | $260 | 70% |
| 30 | 67 | 4 | 88 | $153 | 15% |
| 0 | 0 | 4 | 80 | $0 | 0% |

Comparative Example 2 - DF-2 Only

| GPD | ppm | Carry Over | Carry Under | Cost/Day | Performance |
|---|---|---|---|---|---|
| 30 | 67 | 1 | 75 | $696 | 41% |
| 18 | 40 | 1 | 75 | $418 | 41% |
| 12 | 27 | 2 | 80 | $278 | 33% |
| 5 | 11 | 4 | 78 | $116 | -4% |
| 0 | 0 | 4 | 80 | $0 | 0% |

Comparative Example 3 - DF-3 Only

| GPD | ppm | Carry Over | Carry Under | Cost/Day | Performance |
|---|---|---|---|---|---|
| 29 | 64 | 1 | 83 | $673 | 56% |
| 15 | 33 | 1 | 85 | $348 | 59% |
| 7 | 16 | 2 | 86 | $162 | 44% |
| 0 | 0 | 4 | 80 | $0 | 0% |

Inventive Example 4 - 80% DF-1/20% DF-2

| DF-1 GPD | ppm | DF-2 GPD | ppm | Carry Over | Carry Under | Cost/Day | Performance |
|---|---|---|---|---|---|---|---|
| 50 | 111 | 12 | 27 | 2 | 103 | $533 | 76% |
| 38 | 84 | 9 | 20 | 3 | 100 | $304 | 54% |
| 12 | 27 | 5 | 11 | 4 | 95 | $177 | 28% |
| 0 | 0 | 0 | 0 | 4 | 80 | $0 | 0% |

Inventive Example 5 - 80% DF-1/20% DF-3

| DF-1 GPD | ppm | DF-2 GPD | ppm | Carry Over | Carry Under | Cost/Day | Performance |
|---|---|---|---|---|---|---|---|
| 57 | 127 | 15 | 33 | 1 | 107 | $639 | 100% |
| 45 | 100 | 11 | 24 | 1 | 100 | $485 | 87% |
| 30 | 67 | 7 | 16 | 2 | 86 | $315 | 44% |
| 0 | 0 | 0 | 0 | 4 | 80 | $0 | 0% |

TABLE III

Well B Data

Comparative Example 6 - DF-1 Only

| GPD | ppm | Carry Over | Carry Under | Cost/Day | Performance |
|---|---|---|---|---|---|
| 160 | 261 | 3 | 98 | $816 | 53% |
| 141 | 230 | 3 | 100 | $719 | 56% |
| 110 | 179 | 4 | 93 | $561 | 28% |
| 78 | 127 | 4 | 87 | $398 | 19% |
| 0 | 0 | 4 | 75 | $0 | 0% |

Comparative Example 7 - DF-2 Only

| GPD | ppm | Carry Over | Carry Under | Cost/Day | Performance |
|---|---|---|---|---|---|
| 35 | 57 | 2 | 77 | $812 | 36% |
| 30 | 49 | 3 | 80 | $696 | 24% |
| 16 | 26 | 3 | 74 | $371 | 15% |
| 0 | 0 | 4 | 75 | $0 | 0% |

Comparative Example 8 - DF-3 Only

| GPD | ppm | Carry Over | Carry Under | Cost/Day | Performance |
|---|---|---|---|---|---|
| 80 | 130 | 3 | 95 | $1,856 | 48% |
| 54 | 88 | 4 | 89 | $1,253 | 22% |
| 29 | 47 | 4 | 75 | $673 | 0% |
| 12 | 20 | 4 | 70 | $278 | -8% |
| 0 | 0 | 4 | 75 | $0 | 0% |

Inventive Example 9 - 80% DF-1/20% DF-2

| DF-1 GPD | ppm | DF-2 GPD | ppm | Carry Over | Carry Under | Cost/Day | Performance |
|---|---|---|---|---|---|---|---|
| 136 | 221 | 33 | 54 | 2 | 106 | $1,459 | 82% |
| 80 | 130 | 22 | 36 | 3 | 98 | $918 | 53% |
| 0 | 0 | 0 | 0 | 4 | 75 | $0 | 0 |

Inventive Example 10 - 80% DF-1/20% DF-3

| DF-1 GPD | ppm | DF-2 GPD | ppm | Carry Over | Carry Under | Cost/Day | Performance |
|---|---|---|---|---|---|---|---|
| 136 | 221 | 32 | 52 | 2 | 102 | $1,436 | 76% |
| 81 | 132 | 19 | 31 | 2 | 96 | $854 | 66% |
| 0 | 0 | 0 | 0 | 4 | 75 | $0 | 0% |

TABLE IV

Well A Data

Comparative Example 11 - DF-1 Only

| GPD | ppm | Carry Over | Carry Under | Cost/Day | Performance |
|---|---|---|---|---|---|
| 120 | 163 | 2 | 107 | $612 | 85% |
| 80 | 108 | 3 | 105 | $408 | 65% |
| 39 | 53 | 4 | 85 | $199 | 6% |
| 0 | 0 | 4 | 82 | $0 | 0% |

Comparative Example 12 - DF-2 Only

| GPD | ppm | Carry Over | Carry Under | Cost/Day | Performance |
|---|---|---|---|---|---|
| 24 | 33 | 3 | 80 | $557 | 13% |
| 15 | 20 | 3 | 78 | $348 | 8% |
| 0 | 0 | 4 | 82 | $0 | 0% |

Comparative Example 13 - DF-3 Only

| GPD | ppm | Carry Over | Carry Under | Cost/Day | Performance |
|---|---|---|---|---|---|
| 42 | 58 | 1 | 97 | $998 | 81% |
| 30 | 41 | 2 | 84 | $696 | 38% |
| 15 | 20 | 4 | 76 | $348 | -13% |
| 0 | 0 | 4 | 82 | $0 | 0% |

Inventive Example 14 - 70–75% DF-1/30–25% DF-2

| DF-1 GPD | ppm | DF-2 GPD | ppm | Carry Over | Carry Under | Cost/Day | Performance |
|---|---|---|---|---|---|---|---|
| 78 | 106 | 33 | 45 | 1 | 105 | $1,163 | 98% |
| 61 | 83 | 18 | 24 | 1 | 105 | $729 | 98% |
| 0 | 0 | 0 | 0 | 4 | 82 | $0 | 0 |

Inventive Example 15 - 70–75% DF-1/30–25% DF-3

| DF-1 GPD | ppm | DF-2 GPD | ppm | Carry Over | Carry Under | Cost/Day | Performance |
|---|---|---|---|---|---|---|---|
| 80 | 108 | 31 | 42 | 2 | 104 | $1,127 | 79% |
| 59 | 80 | 20 | 27 | 2 | 102 | $765 | 75% |
| 0 | 0 | 0 | 0 | 4 | 82 | $0 | 0% |

Laboratory Test Data: Examples 16–20

These Examples were run using a laboratory gas sparge test on another deep water Gulf of Mexico crude oil (Well D) at ambient temperature and pressure, and confirmed that the inventive blend does indeed out-perform the conventional, single component defoamers, in this case DF-1 and DF-3. The experiments were conducted as follows:

1. Add 30 ml of oil to a column and allow to stand for a few minutes to come to thermal equilibrium. The temperature was set to 83° F. (28° C.), and both the nitrogen gas and the column walls were kept at that temperature with a circulator bath.
2. Bubble the nitrogen through the column at a rate of 14 ml/min.
3. Record the height of the liquid plus foam every minute.
4. Cut the flow of nitrogen after the height reaches a steady position.
5. Record the height every minute and the final time of collapse.

The amount of foam suppressant added in each case was 1 ppm.

Figure 10:
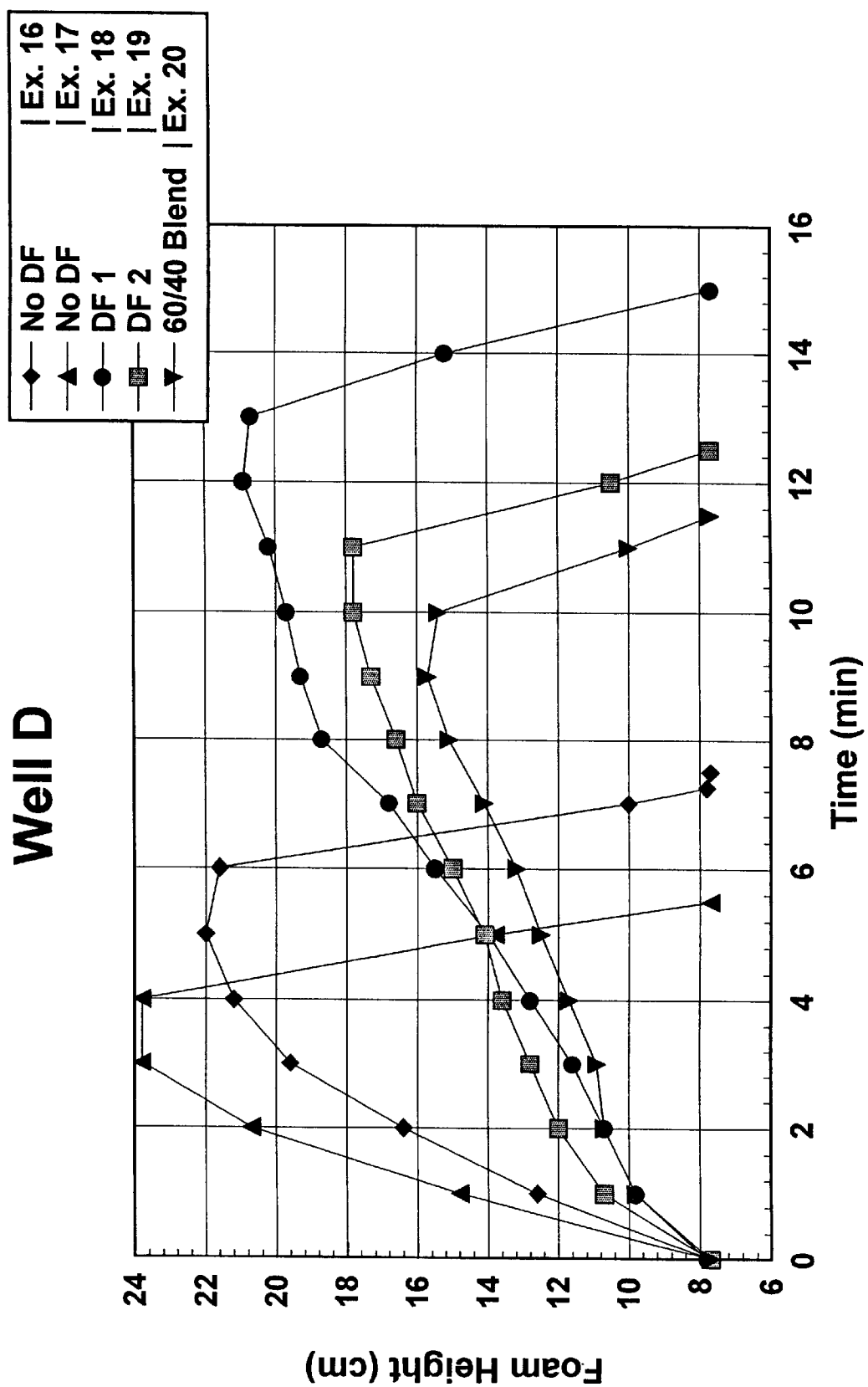
FIG. 10 shows plots of foam height versus time for another oil based foam using no defoamer (Examples 16–17), conventional, comparative defoamers (Examples 18–19), and an inventive foam suppressant blend (Example 20).

The data are presented in Table V below, and plotted on FIG. 10. It will be readily seen that the 60/40 blend of DF-1 and DF-3 suppressed the initial foam height better than DF-1 and DF-3 used singly. Further, the foam collapsed faster for the oil with the inventive blend, than for either of the conventional, single components.

TABLE V

Comparative Foam Suppression

| Time, Minutes | Example 16 No Defoamer | Example 17 No Defoamer | Example 18 DF-1 | Example 19 DF-3 | Example 20 60/40 Blend DF-1/DF-3 |
|---|---|---|---|---|---|
| 0 | 7.7 | 7.7 | 7.8 | 7.7 | 7.7 |
| 1 | 12.6 | 14.8 | 9.8 | 10.7 | 9.8 |
| 2 | 16.4 | 20.7 | 10.7 | 12 | 10.7 |
| 3 | 19.6 | 23.8 | 11.6 | 12.8 | 10.9 |
| 4 | 21.2 | 23.8 | 12.8 | 13.6 | 11.7 |
| 5 | 22 | 13.8 | 14 | 14.1 | 12.5 |
| 5.5 | — | 7.7 | — | — | — |
| 6 | 21.6 | | 15.5 | 15 | 13.2 |
| 7 | 10 | | 16.8 | 16 | 14.1 |
| 7.25 | 7.8 | | — | — | — |
| 7.5 | 7.7 | | — | — | — |
| 8 | | | 18.7 | 16.6 | 15.1 |
| 9 | | | 19.3 | 17.3 | 15.7 |
| 10 | | | 19.7 | 17.8 | 15.4 |
| 11 | | | 20.2 | 17.8 | 10 |
| 11.5 | | | — | — | 7.7 |
| 12 | | | 20.9 | 10.5 | |
| 12.5 | | | — | 7.7 | |
| 13 | | | 20.7 | | |
| 14 | | | 15.2 | | |
| 15 | | | 7.7 | | |

Many modifications may be made in the present invention without departing from the spirit and scope thereof which are defined only by the appended claims. For example, certain combinations of components thereof other than those specifically set out herein may be found by one of routine skill in the art to be particularly advantageous. Additionally, certain proportions of components may produce reaction products or proportions of reaction products having particular efficacy.

We claim:

1. A method for suppressing oil-based foam in a system comprising:
   introducing from about 4 to 10 wt. % fluorosilicone into the foam; and
   introducing from about 96 to 90 wt. % non-fluorinated siloxane into the foam,
   where the proportions are based on the total amount of fluorosilicone and non-fluorinated siloxane;
   where the fluorosilicone and the non-fluorinated siloxane may be added in any sequence.

2. The method of claim 1 where the non-fluorinated siloxane is polydimethylsiloxane (PDMS).

3. The method of claim 1 where fluorosilicone is a copolymer partially containing fluorine.

4. The method of claim 1 where the fluorosilicone and the non-fluorinated siloxane are added together as a composition.

5. The method of claim 4 wherein the composition further comprises a solvent.

6. A method for suppressing oil-based foam in a system comprising:
   introducing from about 4 to 10 wt. % fluorosilicone into the foam; and
   introducing from about 96 to 90 wt. % non-fluorinated siloxane into the foam,
   where the proportions are based on the total amount of fluorosilicone and non-fluorinated siloxane;
   where the introducing of fluorosilicone and the introducing of non-fluorinated siloxane are separate.

7. The method of claim 6 where the non-fluorinated siloxane is polydimethylsiloxane (PDMS).

8. The method of claim 6 where fluorosilicone is a copolymer partially containing fluorine.

9. A composition for suppressing oil-based foam comprising a blend of:
   from about 4 to 10 wt. % of a fluorosilicone; and
   from about 96 to 90 wt. % of a non-fluorinated siloxane;
   where the proportions are based on the total amount of fluorosilicone and non-fluorinated siloxane; and
   in an absence of block copolymers of PDMS and polybutadiene.

10. The composition of claim 9 where the non-fluorinated siloxane is polydimethylsiloxane (PDMS).

11. The composition of claim 9 where the fluorosilicone is a copolymer partially containing fluorine.

12. The composition of claim 9 further comprising a solvent.

13. The composition of claim 12 where the solvent is selected from the group consisting of methyl isobutyl ketone, acetone, methyl ethyl ketone, Stoddard solvent, kerosene, diesel, aliphatic refinery distillates and combinations thereof.

* * * * *